United States Patent [19]
Peterson

[11] Patent Number: 5,887,933
[45] Date of Patent: Mar. 30, 1999

[54] SUN VISOR

[75] Inventor: Don Mangas Peterson, West Bloomfield, Mich.

[73] Assignee: Lear Corporation, Southfield, Mich.

[21] Appl. No.: 893,169

[22] Filed: Jul. 15, 1997

[51] Int. Cl.[6] .................................................. B60J 3/00
[52] U.S. Cl. ............................................................... 296/97.1
[58] Field of Search ........................................... 296/97.1

[56] References Cited

U.S. PATENT DOCUMENTS

| | | |
|---|---|---|
| 3,751,106 | 8/1973 | Mahler et al. . |
| 4,275,916 | 6/1981 | Skogler . |
| 4,458,938 | 7/1984 | Viertel et al. . |
| 4,486,819 | 12/1984 | Marcus et al. . |
| 4,570,990 | 2/1986 | Flowerday . |
| 4,711,483 | 12/1987 | Gulette et al. . |
| 4,763,946 | 8/1988 | Robbins et al. . |
| 4,890,875 | 1/1990 | Takahashi ............................... 296/97.1 |
| 5,031,951 | 7/1991 | Binish .................................... 296/97.1 |
| 5,131,711 | 7/1992 | Laferle ................................... 296/97.1 |

*Primary Examiner*—Gary C. Hoge
*Attorney, Agent, or Firm*—Brooks & Kushman P.C

[57] ABSTRACT

A sun visor for motor vehicles is disclosed. The sun visor comprises a plastic core having first and second halves defined by a hinge, a cover covering the first and second halves, and a plurality of spikes disposed proximate an inner periphery of each of the first and second halves. The cover includes an edge portion overlying the inner periphery of each of the first and second halves. The spikes engage the edge portion of the cover and are deformed to bond with the edge portion of the cover. Projections extending from one half of the core engage corresponding receptors on the other half of the core to hold the core folded about the hinge in an operational orientation. A method of making the sun visor is also disclosed.

22 Claims, 2 Drawing Sheets

5,887,933

SUN VISOR

TECHNICAL FIELD

This invention relates to sun visors for motor vehicles, and more particularly to a sun visor having a covering bonded to a plastic core.

BACKGROUND ART

Visors for blocking the sun and other sources of glare have been standard equipment on motor vehicles for many years. These visors are generally mounted to the upper outside corner of the driver and/or passenger side compartment, and have conventionally been constructed with structural cores of plastic, hard board or foam. An aesthetic covering for the core is also normally provided with the visor. To secure the covering to the core, it has been conventional to use an adhesive, either alone or in combination with some mechanical means. U.S. Pat. No. 4,763, 946, for example, shows a sun visor including a polymeric core with pins and corresponding mating recesses formed around the periphery on opposite core halves for compressing the edges of an upholstery material and clamping them in a secure position as the visor halves are brought together during manufacturing. Similarly, U.S. Pat. No. 4,458,938 teaches a sun visor in which a border of the covering material is clamped in a groove in the sun visor body.

One problem with this type of construction is that over a period of time, the cover pulls away from the core.

SUMMARY OF THE INVENTION

The present invention is a sun visor for motor vehicles. The sun visor comprises a core having first and second halves, and a cover covering an outer side of the first and second halves. The cover includes an edge portion overlying an inner periphery of each of the first and second halves. A plurality of spikes disposed proximate the inner periphery of each of the first and second halves engage the edge portion of the cover and are deformed to bond the spikes to the edge portion.

Accordingly, it is an object of the present invention to provide a sun visor of the type described above in which the cover is securely connected to the core.

Another object of the present invention is to provide a sun visor of the type described above in which the cover is securely connected to the core without the further use of adhesives.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
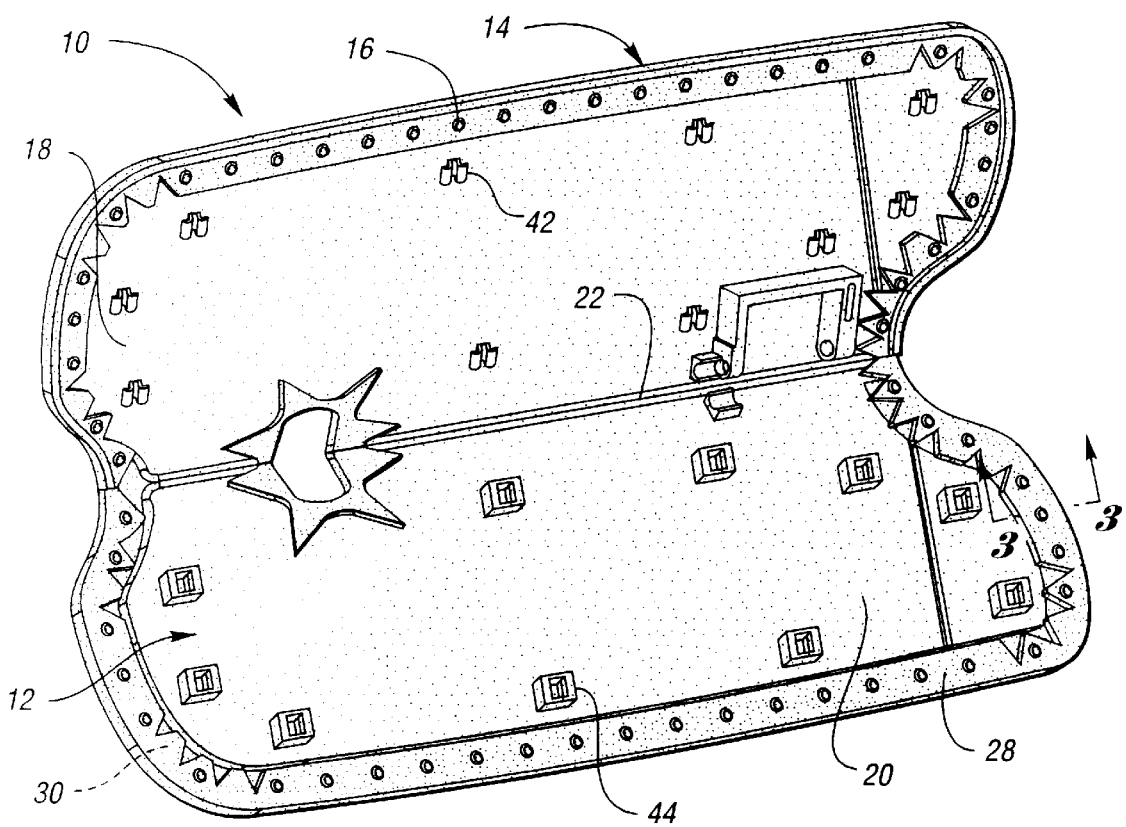
FIG. 1 is a perspective view of a sun visor according to the present invention in an open, unsealed condition.
Figure 2:
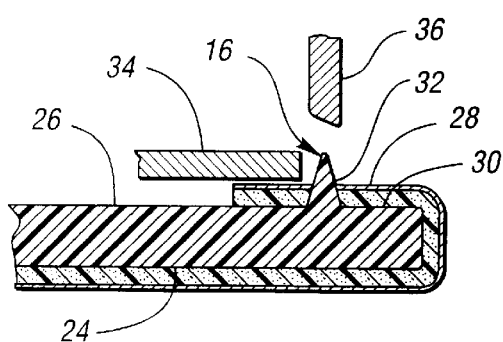
FIG. 2 is a cross-sectional view of an edge of the sun visor prior to a deformation operation.

With reference to the drawings, the preferred embodiments of the present invention will be described. FIGS. 1 and 2 show a sun visor 10 according to the present invention for use in motor vehicles. The sun visor 10 comprises a core or substrate 12, a cover 14 and a plurality of projections or spikes 16.

The core 12, which preferably comprises a thermoplastic such as polypropylene, has a general clamshell configuration including first and second halves respectively 18 and 20 defined by a hinge 22. Each of the first and second halves 18 and 20 has an outer side 24 and an inner side 26. The cover 14, which may for example be a foam backed cloth or vinyl, is disposed around the visor to cover the outer sides 24 of the core halves 18 and 20. To secure the cover around the visor, the cover 14 is provided with an edge portion 28 that overlies an inner periphery 30 of each of the first and second halves.

The spikes 16 are disposed proximate the inner periphery 30 of each of the first and second halves 18 and 20 of the core 12. As shown in FIG. 2, each of the spikes 16 initially includes a generally conical base 32 that tapers to a point adapted to engage the edge portion 28 of the cover. To secure the cover to the spikes, a two-stage process may be used. In the first stage, a primary hold plate 34 contacts and exerts a downward force on the folded-over edge portion 28 adjacent the spikes. This downward force causes the spikes to substantially pierce the edge portion 28. In the second, heatstaking stage of the operation, a secondary heated upper die 36 is brought into contact with the tips of those spikes which have penetrated through the cover or, in those instances where the spikes have not entirely penetrated the cover, into contact with the edge portion 28 of the cover overlying the tips of the spikes.

Figure 5:
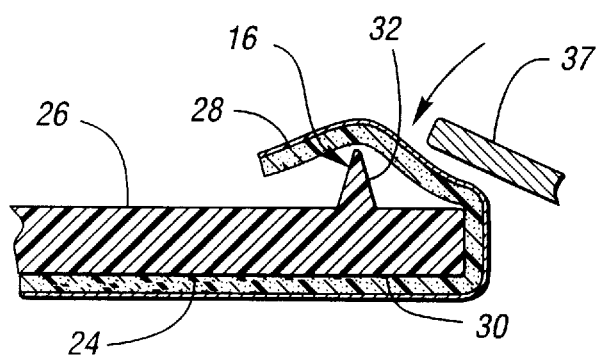
FIG. 5 is a view similar to FIG. 2 and showing an alternative method of attaching an edge portion of a cover to the sun visor.

The die 36 is heated to a temperature of between about 370 and 415 degrees Fahrenheit, and remains in place for an interval of time, preferably between about 5 and 8 seconds, which is inversely proportional to the temperature of the die. The die may thereafter be allowed to cool, for instance to about 150 degrees, before it is retracted to inhibit pulling the edge portion 28 of the cover away from the spikes. As the die is retracted, the primary hold plate 34 may be left in place to further diminish separation of the edge portion from the spikes. In lieu of this heatstaking operation, the tips of the spikes 16 may be similarly acted upon by the application of hot air, sonic or ultrasonic welding energy. FIG. 5 shows an alternative apparatus for temporarily holding the edge portion 28 of the cover prior to deformation of the spikes 32. In this embodiment, a single hold plate 37 swings down as depicted by the arrow to clamp the edge portion 28 against the inner periphery 30 while the heating die, sonic or ultrasonic probes, or other equipment used to effect the spike deformation is brought proximate the spikes 32.

Figure 3:
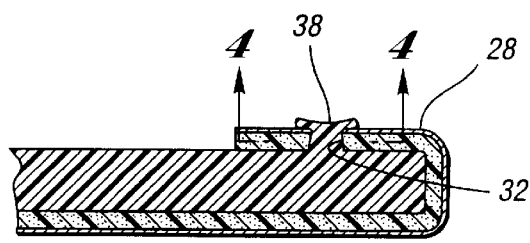
FIG. 3 is a cross-sectional view taken along line 3—3 in FIG. 1.
Figure 4:
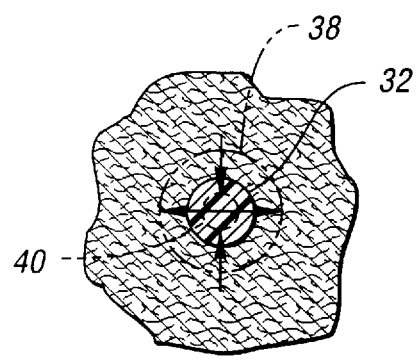
FIG. 4 is a cross-sectional view taken along line 4—4 in FIG. 3.

FIG. 3 shows that regardless of the method employed, the tip of each of the spikes is deformed to preferably provide a cap 38 of resolidified plastic. As shown in FIG. 4, the base 32 of each spike has a minimum dimension, depicted by the vertical arrow, at a location 40 where the base emerges from the edge portion 28 of the cover. In the case of a conical base, this minimum dimension is the diameter of the base at location 40. To facilitate bonding of the cover 14 to the core 12, the cap 38 preferably has a minimum dimension, depicted by the horizontal arrow in FIG. 4, greater than the minimum dimension of the base. Such an arrangement provides a sufficiently secure connection between the edge portion 28 of the cover 14 and the core 12 that there is no need for traditional hot melt glue or other adhesives. In addition to this mechanical bond, it should be appreciated that the base of each of the spikes also melts to some degree and bonds with the cover.

Figure 6:
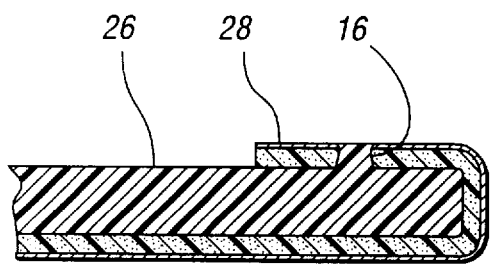
FIG. 6 is a view similar to FIG. 3 and showing an alternative embodiment of the present invention.

FIG. 6 shows an alternative embodiment of the sun visor 10 in which the tips of the spikes 32 are flush with the outer surface of the cover, i.e. no caps 38 are formed. In this embodiment, however, the body of the spike 32 is deformed by melting, and the bond between the cover and the visor core is formed entirely by the joinder of melted plastic to the cover material. In fact, the spikes 32 shown in FIG. 6 may not penetrate the cover, if at all, until the application of heat which partially melts localized areas of the cover. In practice, the spikes 16 around the periphery of the visor halves 18 and 20 may be deformed to varying degrees to a final shape anywhere between those shown in FIGS. 3 and 6.

A series of projections 42, best shown in FIG. 1, extend from the inner side of the core half 18 inboard from the spikes 16. A corresponding series of raised receptors 44 shown in FIG. 1 are formed on the inner side of the other core half 20. After the cover 14 has been secured to the core 12 in the manner described above, the halves are folded together about the hinge 22 such that inclined faces of opposed legs of each of the projections 42 engage corresponding raised walls of the receptors 44 and the legs are biased inwardly. After a head portion of each leg clears a corresponding flange on each of the receptor walls, the legs of the projections 42 spring back outwardly to their original positions to engage the projections with their corresponding receptors 44 to hold the visor closed. Prior to closure, other internal components of the visor, such as a lighted or unlighted vanity mirror, detent clips, end clips and visor pivot rods can be added to the visor core 12 in any conventional manner.

It should be understood that while the forms of the invention shown and described above constitute preferred embodiments of the invention, they are not intended to illustrate all possible forms thereof. It should also be understood that the worious changes may be made without departing from the spirit and scope of the invention disclosed.

I claim:

1. A sun visor for a motor vehicle, the sun visor comprising:

a core having first and second halves, each of the first and second halves having an inner periphery;

a cover covering an outer side of the first and second halves, the cover including an edge portion overlying the inner periphery of each of the first and second halves; and a plurality of spikes disposed proximate the inner periphery of each of the first and second halves of the core, the spikes engaging the edge portion of the cover and being deformed to bond with the edge portion of the cover.

2. The sun visor of claim 1 further comprising at least one projection extending from the first half of the core and at least one receptor formed on the second half of the core, the at least one projection engaging the at least one receptor to hold the first half of the core proximate the second half of the core.

3. The sun visor of claim 1 further comprising a hinge connecting the first and second halves of the core.

4. The sun visor of claim 3 further comprising at least one projection extending from the first half of the core and at least one receptor formed on the second half of the core, the at least one projection engaging the at least one receptor to hold the first half of the core folded to the second half of the core about the hinge.

5. The sun visor of claim 1 wherein the core comprises plastic.

6. The sun visor of claim 1 wherein the core comprises polypropylene.

7. The sun visor of claim 1 wherein the cover comprises cloth.

8. The sun visor of claim 1 wherein the cover comprises vinyl.

9. A sun visor for a motor vehicle, the sun visor comprising:

a plastic core having first and second halves, each of the first and second halves having an inner periphery;

a cover covering the first and second halves, the cover including an edge portion overlying the inner periphery of each of the first and second halves;

a plurality of spikes disposed proximate the inner periphery of each of the first and second halves of the core, the spikes engaging the edge portion of the cover and being deformed to bond with the edge portion of the cover; and at least one projection extending from the first half of the core and at least one receptor formed on the second half of the core, the at least one projection engaging the at least one receptor to hold the first half of the core proximate the second half of the core.

10. The sun visor of claim 9 wherein the cover comprises cloth.

11. The sun visor of claim 9 wherein the cover comprises vinyl.

12. The sun visor of claim 9 further comprising a hinge connecting the first and second halves of the core.

13. A method of making a sun visor for a motor vehicle, the method comprising:

providing a core having first and second halves, each of the first and second halves having a periphery and a plurality of spikes disposed proximate the periphery;

covering the first and second halves with a cover including an edge portion overlying the periphery of each of the first and second halves; and deforming the spikes to bond the spikes with the edge portion of the cover.

14. The method of claim 13 further comprising holding the first half of the core folded to the second half of the core about a hinge.

15. The method of claim 13 further comprising holding the first half of the core folded to the second half of the core with at least one projection extending from the first half of the core engaging at least one receptor formed on the second half of the core.

16. The method of claim 13 wherein the core comprises plastic.

17. The method of claim 13 wherein the core comprises polypropylene.

18. The method of claim 13 wherein the cover comprises cloth.

19. The method of claim 13 wherein the cover comprises vinyl.

20. The method of claim 13 wherein the deforming step comprises heat staking.

21. The method of claim 13 wherein the deforming step comprises sonic welding.

22. The method of claim 13 wherein the deforming step comprises ultrasonic welding.

* * * * *